(12) United States Patent
Clements et al.

(10) Patent No.: US 6,325,605 B1
(45) Date of Patent: *Dec. 4, 2001

(54) APPARATUS TO CONTROL THE DISPERSION AND DEPOSITION OF CHOPPED FIBROUS STRANDS

(75) Inventors: Christopher J. Clements, Guelph; Daniel F. Heisler, Brampton, both of (CA); Kenneth M. Berry, Tarporley (GB)

(73) Assignee: Owens Corning Canada Inc., Scarborough (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/184,575

(22) Filed: Nov. 2, 1998

(51) Int. Cl.$^7$ ........................................ D01G 1/04
(52) U.S. Cl. ................. 425/83.1; 264/115; 264/121; 239/591
(58) Field of Search ................. 425/82.1, 83.1, 425/80.1; 264/115, 121, 128; 19/0.58, 304, 305; 239/591

(56) References Cited

U.S. PATENT DOCUMENTS

| | | | |
|---|---|---|---|
| 4,046,492 | * 9/1977 | Inglis | 417/197 |
| 4,060,355 | * 11/1977 | Walz et al. | 425/7 |
| 4,070,730 | 1/1978 | Pfeifer et al. . | |
| 4,140,450 | 2/1979 | Pfeifer et al. . | |
| 4,161,897 | 7/1979 | Nakazawa et al. . | |
| 4,212,216 | 7/1980 | Ives . | |
| 4,526,618 | * 7/1985 | Keshavan et al. | 427/34 |
| 4,576,621 | 3/1986 | Chappelear et al. . | |
| 4,703,869 | 11/1987 | De Rooy . | |
| 5,017,312 | 5/1991 | Peters et al. . | |
| 5,093,059 | * 3/1992 | Nathoo et al. | 264/121 |
| 5,125,942 | 6/1992 | Nyssen et al. . | |
| 5,328,494 | 7/1994 | Kelman et al. . | |
| 5,340,128 | * 8/1994 | Weiss et al. | 279/60 |
| 5,441,171 | 8/1995 | Maury . | |
| 5,450,777 | 9/1995 | Molnar et al. . | |
| 5,525,180 | 6/1996 | Paul, Jr. et al. . | |
| 5,565,049 | 10/1996 | Simmons et al. . | |
| 5,634,598 | 6/1997 | Colavito et al. | 239/591 |
| 5,637,326 | 6/1997 | Bogue et al. . | |
| 5,688,467 | 11/1997 | Kelman et al. . | |
| 5,700,111 | 12/1997 | Johnson et al. . | |
| 5,704,825 | 1/1998 | LeCompte | 451/102 |
| 5,795,517 | * 8/1998 | Heisler et al. | 264/115 |

FOREIGN PATENT DOCUMENTS

WO 97/42368   11/1997   (WO) .

OTHER PUBLICATIONS

Exair Air Amplifiers—From Web Page Dated Nov. 15, 2000.
Grant, "Hackh's Chemical Dictionary (4th Edition)" 1969 McGraw–Hill, Inc. pp. 363–367.*

* cited by examiner

Primary Examiner—Robert Davis
Assistant Examiner—Donald Heckenberg
(74) Attorney, Agent, or Firm—Inger H. Eckert

(57) ABSTRACT

An air cannon, formed by associating an air amplifier and an outlet cone with one another, receives chopped fibers and forcefully deposits the chopped fibers on a collection surface or web moving beyond an outlet end of the outlet cone. The air amplifier includes insert structure formed of an abrasion resistant material to prevent abrasive wear within the air amplifier caused by the chopped fibers. A binder is applied to the resulting mat of chopped fibers, the binder is activated by the application of energy with the resulting treated mat being compacted, cooled and rolled up to form a chopped strand mat package. For wide mats, one or more banks of air cannons extend across the moving collection web. The air cannons of each bank are alternately directed up-line and down-line of the web to reduce interference between the air cannons by means of L-shaped support rods which have generally horizontal and generally vertical legs which are separated from one another by acute and obtuse angles for up-line and down-line direction, respectively. The air cannons can also be individually adjusted to vary the aimed direction of the air cannons across the web by rotation of the generally horizontal legs of the L-shaped support rods. The air cannons forcefully direct chopped fibers to the web to overcome air turbulence within a forming hood and forces due to static electricity.

25 Claims, 11 Drawing Sheets

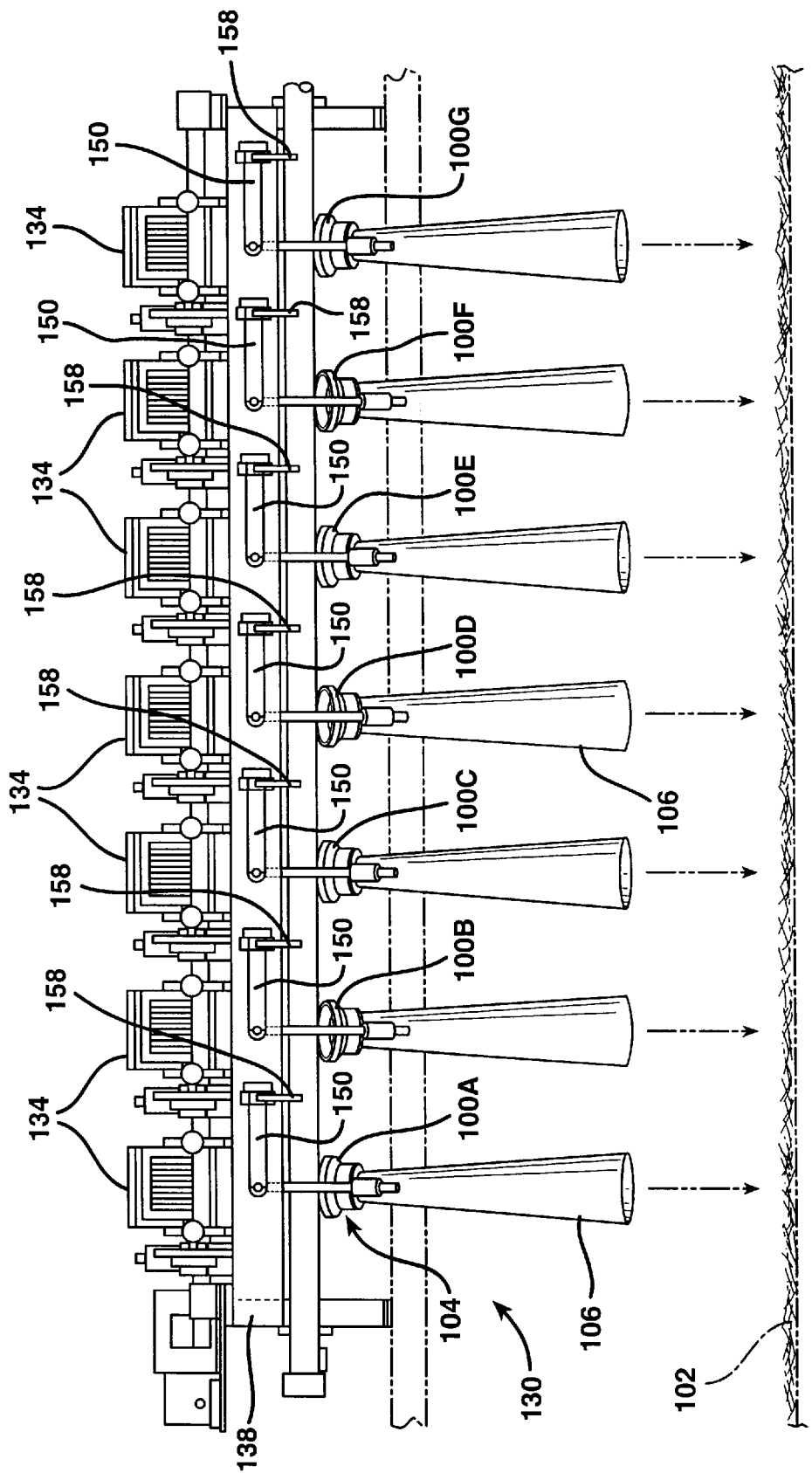

APPARATUS TO CONTROL THE DISPERSION AND DEPOSITION OF CHOPPED FIBROUS STRANDS

CROSS-REFERENCES TO RELATED APPLICATIONS

This application is related to commonly assigned U.S. Pat. No. 5,795,517, COLLECTION AND DEPOSITION OF CHOPPED FIBROUS STRANDS FOR FORMATION INTO NON-WOVEN WEBS OF BONDED CHOPPED FIBERS, issued Aug. 18, 1998, by Heisler et al., the disclosure of which is incorporated herein by reference.

TECHNICAL FIELD

The present invention relates in general to the dispersion and deposition of chopped fibrous materials and, more particularly, to apparatus for collecting chopped fibers from a source of such fibers and depositing the chopped fibers on a collection surface to be processed into non-woven webs of bonded chopped fibrous materials commonly referred to as chopped strand mat. While the invention is generally applicable to a wide variety of fibrous materials including mineral and organic fibrous materials, it will be described herein with reference to glass fibers for which it is particularly applicable and initially being applied.

BACKGROUND ART

Continuous strands of fibrous material, such as glass filaments, have been collected and distributed using opposed Coanda effect surfaces to produce mats of such material used, for example, for insulation. Examples of such equipment are disclosed in U.S. Pat. Nos. 4,300,931; 4,466,819; and, 4,496,384. Such continuous strands typically are handled wet since they are coated with binder or sizing which is sprayed or otherwise applied to the strands prior to the strands being passed to the Coanda effect surfaces.

Unlike these continuous fibers, chopped fibers are dry such that there can be a substantial build up of static electricity during their processing. Accordingly, when chopped fibers are handled, equipment for suppressing or dissipating static electricity is normally provided. Unfortunately, static suppression equipment adds expense to equipment handling dry chopped fibers and can cause problems of its own in terms of maintenance.

Even so, non-woven webs of bonded chopped glass, i.e., chopped strand mat, have been produced for many years. An initial step in that production is to collect the chopped glass and deposit it onto a moving collection surface with the resulting mat of chopped glass being processed to produce the chopped strand mat. Choppers are positioned over a forming hood which surrounds the collection surface with the choppers providing chopped glass to the forming hood through openings in the top of the hood to direct a chopped glass stream toward the collection surface. Air nozzles are angled into the glass stream in an attempt to disperse the glass stream.

The amount of glass strand input to each of the choppers is adjusted and the nozzles bent in an attempt to evenly distribute the chopped glass on the collection surface. The collection surface is foraminous and has air drawn through it to assist in the even distribution of the chopped glass and to draw the glass to the collection surface. Unfortunately, these efforts to achieve uniform fiber distribution on the collection surface are not always successful.

There is, thus, a need for improved apparatus for collecting chopped fibers from a source of such fibers and depositing the chopped fibers on a collection surface such that the chopped fibers are evenly distributed and thereby better able to be processed into chopped strand mat. Preferably, such apparatus would overcome problems with turbulent air flow in the forming hood and static electricity which are associated with existing chopped fiber handling.

DISCLOSURE OF INVENTION

This need is met by the methods and apparatus of the present invention wherein an air amplifier and an outlet cone are associated with one another to form an air cannon which receives chopped fibers and forcefully deposits the chopped fibers on a collection surface or web moving beyond an outlet end of the outlet cone. The inner surface of the air amplifier is formed of an abrasion resistant material to prevent abrasive wear within the air amplifier. A binder is applied to the resulting mat of chopped fibers. The binder may be activated by the application of energy such as heat with the resulting treated mat being compacted, cooled and rolled up to form a chopped strand mat package. For wide mats, one or more banks each made up of at least one and preferably a plurality of air cannons extend across the moving collection web. The air cannons of a bank containing a plurality of air cannons are preferably alternately directed up-line and down-line of the web to reduce interference between the air cannons which can also be individually adjusted to vary the aimed direction of the air cannons across the web. The air cannons forcefully direct chopped fibers to the web and thereby overcome air turbulence within the forming hood and forces due to static electricity.

According to a first aspect of the present invention, an air cannon for collecting chopped fibrous material and depositing received chopped fibers on a moving collection surface is provided. The air cannon comprises an air amplifier having an inlet receiving the chopped fibers, an outlet, and an inner section defining a passage through the air amplifier extending from the inlet to the outlet. The air amplifier is driven by compressed air which enters the passage of the air amplifier through an air passageway. At least a portion of the inner section of the air amplifier is formed of an abrasion resistant material. The air cannon also comprises an outlet cone having an inlet end positioned adjacent the outlet of the air amplifier and an outlet end for directing chopped fibers onto the moving collection surface.

Preferably, substantially all of the inner section of the air amplifier is formed of the abrasion resistant material. The abrasion resistant material preferably comprises metal carbide or metal carbide coated graphite, such as titanium carbide, tungsten carbide, and chromium carbide. The abrasion resistant material may have a thickness ranging from approximately 0.0045 inches to approximately 0.0075 inches, and preferably, approximately 0.006 inches. Preferably, the microhardness of the abrasion resistant material is greater than 2500 vickers-100 g load.

The air amplifier may comprise a shell having an inner surface defining the inner section of the air amplifier. The air amplifier may alternatively comprise a shell and insert structure having an inner surface which defines the inner section of the air amplifier. Preferably, the insert structure is adhesively bonded to the shell. The shell is preferably formed of a material selected from aluminum, steel, stainless steel, plastic or glass. The insert structure may comprise a truncated cone shaped first portion and a truncated cone shaped second portion. Preferably, the first and second portions of the insert structure are separate and distinct components.

According to another aspect of the present invention, an air cannon for collecting chopped fibrous material and depositing received chopped fibers on a moving collection surface is provided. The air cannon comprises an air amplifier having an inlet receiving the chopped fibers, an outlet, and an inner section defining a passage through the air amplifier extending from the inlet to the outlet. The air amplifier comprises a shell and insert structure coupled to the shell. The insert structure has an inner surface which defines the inner section of the air amplifier. The insert structure is formed of titanium carbide and comprises a truncated cone shaped first portion and a truncated cone shaped second portion. The air amplifier is driven by compressed air which enters the passage of the air amplifier through an air passageway between the first and second portions. The air cannon also comprises an outlet cone having an inlet end positioned adjacent the outlet of the air amplifier and an outlet end for directing chopped fibers onto the moving collection surface.

According to yet another aspect of the present invention an apparatus is provided for collecting chopped fibrous material and depositing received chopped fibers on a moving collection surface. The apparatus comprises at least one air cannon. The air cannon comprises an air amplifier having an inlet receiving the chopped fibers, an outlet, and an inner section defining a passage through the air amplifier extending from the inlet to the outlet. The air amplifier is driven by compressed air which enters the passage of the air amplifier through an air passageway. The inner section is formed of an abrasion resistant material. The air amplifier further comprises an outlet cone having an inlet end positioned adjacent the outlet of the air amplifier and an outlet end for directing chopped fibers onto the moving collection surface.

Preferably, substantially all of the inner section is formed of the abrasion resistant material The abrasion resistant material preferably comprises a metal carbide. The apparatus may comprise at least one bank of air cannons mounted across the moving collection surface. The bank of air cannons comprises a plurality of air cannons which are positioned relative to one another to reduce interference therebetween. The apparatus may further comprise a plurality of generally L-shaped rods for mounting the plurality of air cannons to direct alternate air cannons up-line and down-line relative to movement of the moving collection surface to thereby reduce interference between the plurality of air cannons. The L-shaped rods have generally horizontal legs mounted to a support frame and generally vertical legs with the air cannons secured thereto. The L-shaped rods have alternating acute and obtuse angles between their generally horizontal and generally vertical legs to direct alternate air cannons up-line and down-line.

Preferably, the generally horizontal legs of the mounting rods are mounted for rotation in the support frame for movement of the air cannons in the cross direction of the moving collection surface and further comprise adjustment arms secured to the generally horizontal legs for adjusting the rotational position of the generally horizontal legs of the L-shaped rods. The apparatus may further comprise locking devices associated with the adjustment arms for locking the adjustment arms and hence the generally horizontal legs in preferred rotational positions. Preferably, the locking devices comprise eye bolts passing through oblong holes in the adjustment arms and cam levers pivotally mounted to the eye bolts with the cam levers in one position releasing the adjustment arms for movement of the adjustment arms within limits defined by the oblong holes and the eye bolts, and in another position securing the adjustment arms to the support frame for maintaining adjustments of the mounting rods and thereby cross direction positioning of the air cannons. The outlet cone is preferably secured to the air amplifier. The apparatus may further comprise two banks of air cannons mounted across the moving collection surface.

It is, thus, an object of the methods and apparatus of the present invention to provide improved deposition of chopped fibers on a moving collection surface for processing the resulting mat of chopped fibers into a chopped strand mat; and to provide improved deposition of chopped fibers on a moving collection surface by an air cannon including an air amplifier and an outlet cone where an inner section of the air cannon includes an abrasion resistant material.

Other objects and advantages of the invention will be apparent from the following description, the accompanying drawings and the appended claims.

BRIEF DESCRIPTION OF DRAWINGS

FIGS. 3, 4 and 5 are front, top and side views, respectively, of apparatus including a bank of air cannons as illustrated in FIGS. 1 and 2;

MODES FOR CARRYING OUT THE INVENTION

Figure 1:
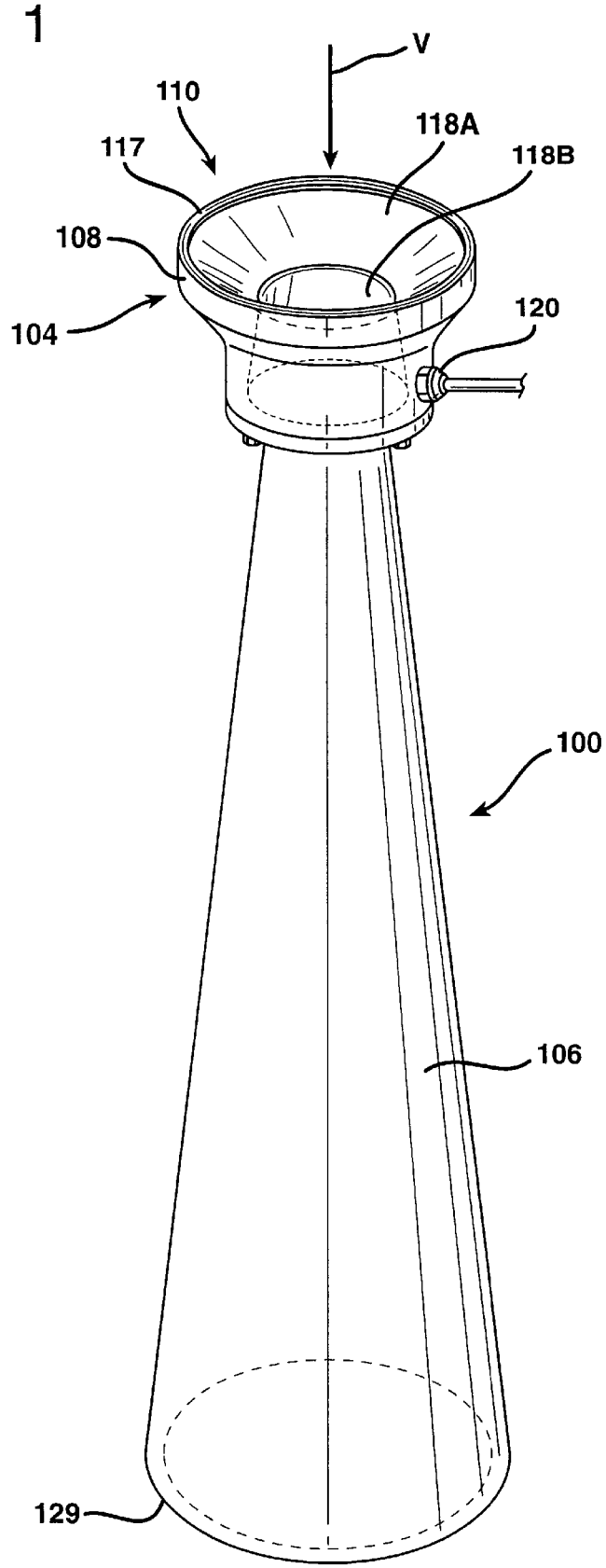
FIG. 1 is a perspective view of an air cannon operable in accordance with the present invention.
Figure 2:
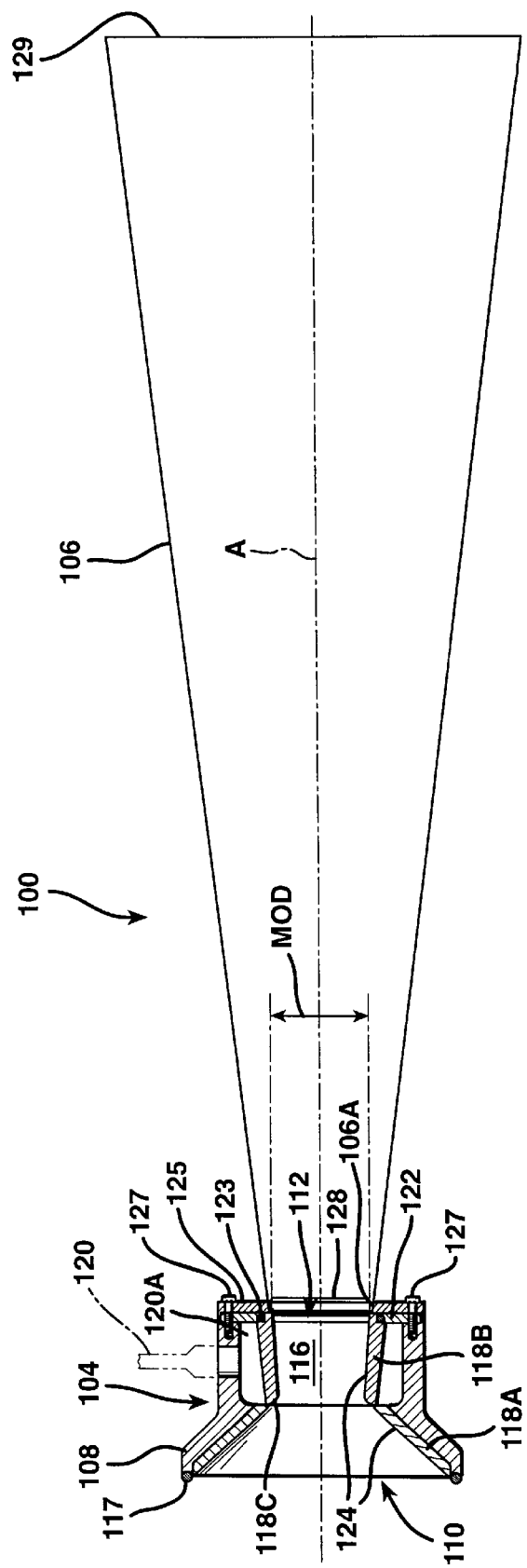
FIG. 2 is a side view of the air cannon of FIG. 1.
Figure 2A:
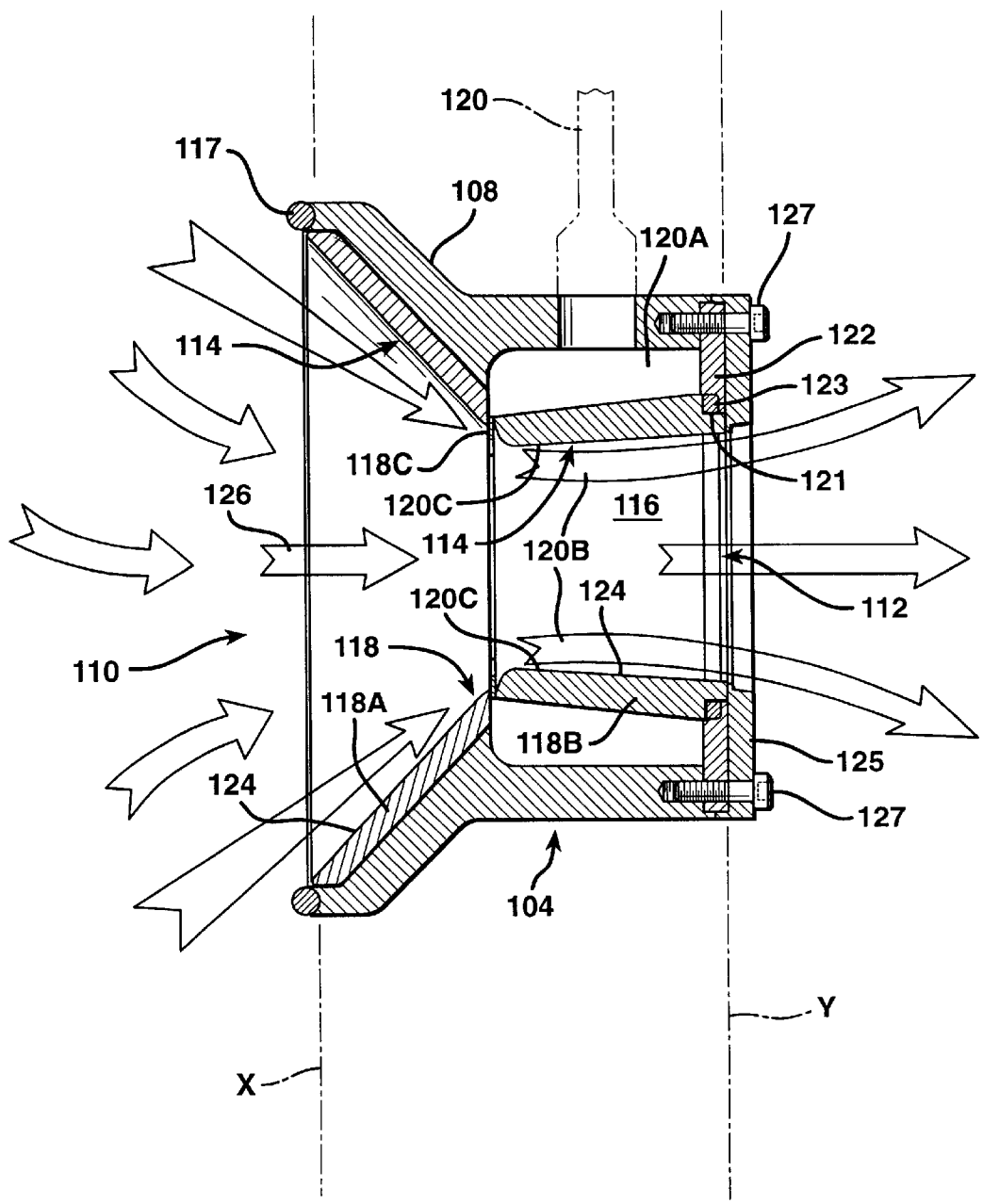
FIG. 2A is a cross-sectional view of an air amplifier of FIGS. 1 and 2.

Reference will now be made to the drawings wherein FIGS. 1 and 2 illustrate an air cannon 100 which, alone or in banks of air cannons 100, collects chopped fibrous material, such as chopped glass fibers, and deposits received chopped fibers on a moving collection surface 102 as shown in FIGS. 3–5 and 9. The air cannon 100 comprises a pneumatically powered air amplifier 104 and a diffuser or outlet cone 106. Referring also to FIG. 2A, the air amplifier 104 comprises an inlet 110 located in plane X in FIG. 2A, an outlet 112 located in plane Y, and an inner section 114 which defines a passage 116 through the air amplifier 104 extending from the inlet 110 at plane X to the outlet 112 at plane Y. The air amplifier 104, in the embodiment illustrated in FIGS. 1, 2 and 2A, includes a shell 108 and insert structure 118 coupled to the shell 108.

Opposing ends of the shell 108 define the inlet 110 and the outlet 112 of the amplifier 104. The air amplifier 104 includes a bumper 117 secured to the shell 108 substantially adjacent to the inlet 110 using an appropriate adhesive. The bumper 117 is preferably formed of an elastic or flexible material, such as rubber, to protect the inlet portion of the air amplifier 104 from impact loads. The insert structure 118 includes an inner surface 124 which defines the inner section 114 of the air amplifier 104. The insert structure 118 includes a truncated cone shaped first portion 118A, a truncated cone shaped second portion 118B and an annular spacer portion 118C.

The spacer portion 118C functions as a shim to keep the first portion 118A separated from the second portion 118B. In the illustrated embodiment, the spacer portion 118C has a thickness of approximately 0.004 inches. The first portion 118A extends from the inlet 110 at the plane X to the spacer portion 118C, see FIG. 2A. The first portion 118A has a shape that generally matches the shape of the shell 108 in this area. The second portion 118B extends from the spacer portion 118C to the outlet 112 at the plane Y. Its shape generally defines the inner section 114 of the air amplifier 104 in this area. In the illustrated embodiment, the first portion 118A, the second portion 118B and the spacer portion 118C are separate and distinct components. However, it will be appreciated by those skilled in the art that the first portion 118A, the second portion 118B and the spacer portion 118C of the insert structure 118 may be formed of a single integral component.

Figure 2B:
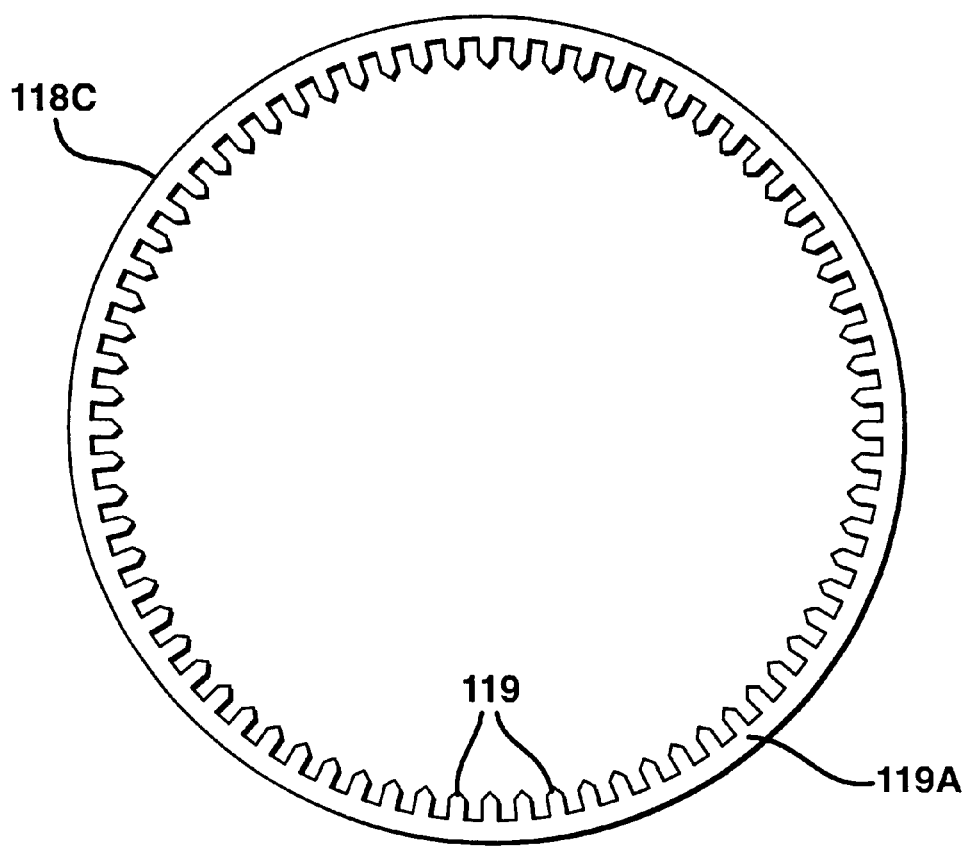
FIG. 2B is a top view of a spacer portion for the air cannon of FIGS. 1 and 2.

As shown in FIG. 2B, the spacer portion 118C of the insert structure 118 comprises a plurality of fingers 119 projecting inwardly from an outer edge 119A of the spacer portion 118C. The fingers 119 help maintain the separation between the first and second portions 118A, 118B of the insert structure 118 while spaces 119B between the fingers 119 define air passageways between the portions 118A, 118B. The first portion 118A engages the spacer portion 118C along the fingers 119 of the spacer portion 118C and the second portion 118B engages the spacer portion 118C along the fingers 119 such that the air passageways are defined between the first and second portions 118A, 118B by the spaces 119B between the fingers 119.

Figure 5:
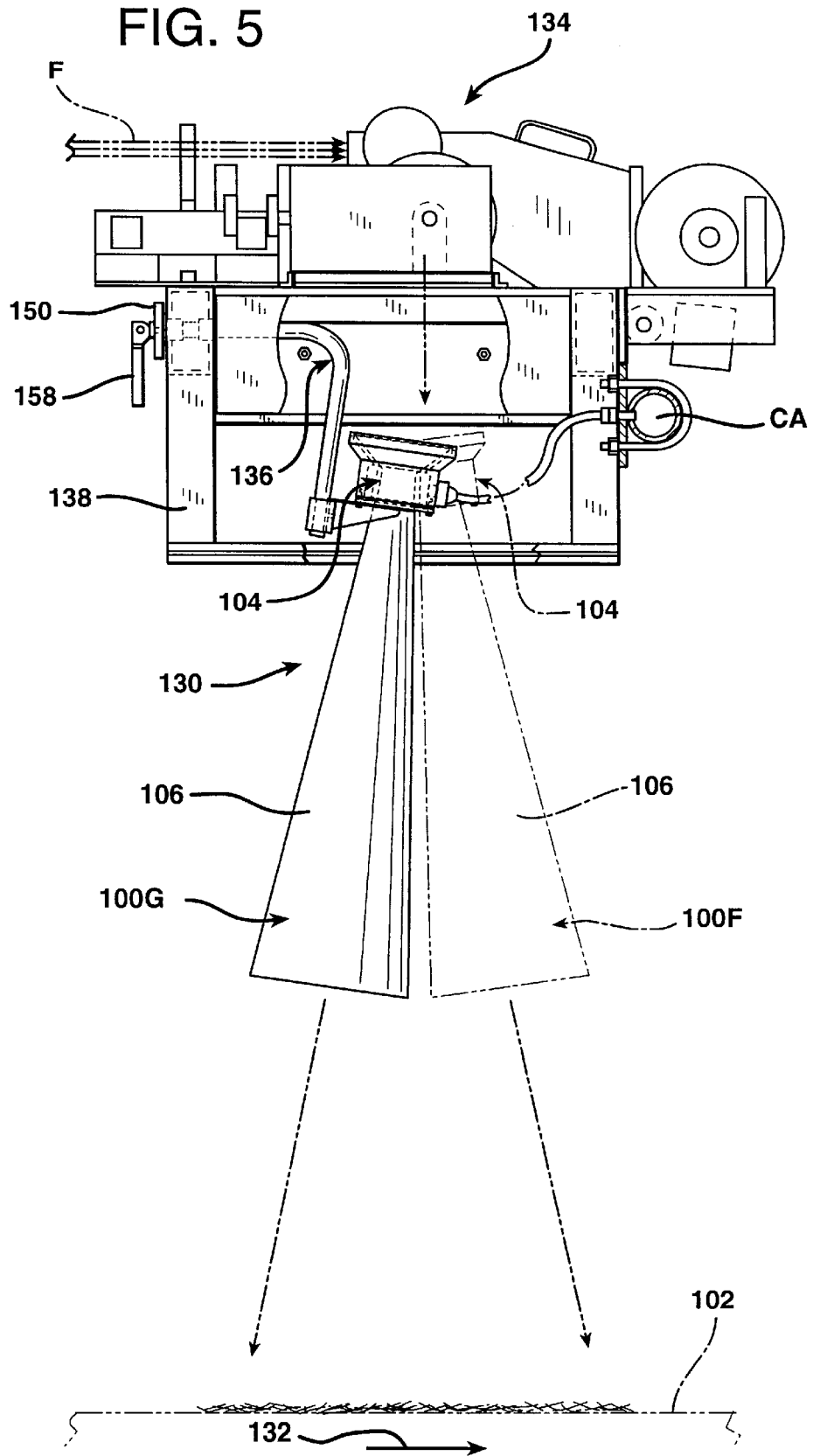

Referring again to FIG. 2A, the air amplifier 104 is driven by compressed air injected into an air inlet 120 coupled to the shell 108 from a source of compressed air CA, see FIG. 5, with the compressed air passing through the inlet 120 into an annular chamber 120A in the shell 108. From the annular chamber 120A, the compressed air passes into the passage 116 of the air amplifier 104 at high velocity through the air passageways extending between the first and second portions 118A, 118B and created by the spaces 119B between the fingers 119 of the spacer portion 118C.

The compressed air defines a primary air stream 120B which adheres to an annular Coanda profile 120C defined by the inner surfaces 124 of the insert structure 118, see FIG. 2A. A low pressure area 126 is created by the primary stream 120B inducing a high volume flow of ambient air into the air amplifier 104.

Referring again to FIGS. 1 and 2, the inlet 110 of the air amplifier 104 receives chopped fibers and directs them through the air amplifier 104. An inlet end 128 of the outlet cone 106 is positioned adjacent the outlet 112 of the air amplifier 104 with an outlet end 129 of the outlet cone 106 directing chopped fibers onto the moving collection surface 102. The outlet cone 106 is preferably constructed as a frustum of a circular cone from stainless steel to extend its longevity. Other geometrically shaped cones can be used in the present invention as should be apparent.

The shell 108 of the air amplifier 104 is preferably comprised of aluminum, steel, stainless steel, plastic or glass. The insert structure 118 is formed of an abrasion resistant material to prevent abrasive wear to the inner section 114 of the air amplifier 104. While it is preferred that substantially all of the insert structure 118 be formed of an abrasion resistant material, it will be appreciated by those skilled in the art that only those portions of the insert structure 118 contacted by or subjected to influence of the chopped fibers need include the abrasion resistant material.

In the illustrated embodiment, the abrasion resistant material comprises metal carbide or metal carbide coated graphite. The metal carbide may comprise titanium carbide, tungsten carbide, and chromium carbide. It will be appreciated by those skilled in the art that other carbon based materials, such as diamond, may be used to form the insert structure 118.

The first portion 118A of the insert structure 118 is coupled to the shell 108 by any appropriate adhesive compatible with the materials forming the shell 108 and the insert structure 118.

As shown in FIGS. 2 and 2A, the second portion 118B of the insert structure 118 is mechanically secured within the air amplifier 104 between the spacer portion 118C and an annular mounting ring 122. The trailing edge of the second portion 118B includes a cut-out section 121 forming a shoulder for receiving an O-ring 123. The O-ring 123 is positioned within the cut-out section 121 providing a seal between the second portion 118B and the annular mounting ring 122. The annular mounting ring 122 itself is secured to the shell 108 by another mounting ring 125 that is bolted to the shell 108 using a plurality of fasteners 127. It should be apparent that as the mounting rings 122, 125 are bolted to the shell 108, the O-ring 123 is compressed thereby providing a substantially air tight seal between the annular chamber 120A, the mounting rings 123, 125 and the second portion 118B. It will be appreciated by those skilled in the art that the insert structure 118 could be formed integrally with the shell 108 thereby alleviating the need for a separate insert structure.

In the illustrated embodiment, titanium carbide is used in forming the insert structure 118. The titanium carbide insert structure 118 is formed using physical vapor deposition or chemical vapor deposition processes known in the art. Graphite having a desired shaped for the insert structure 118 is positioned within a vapor deposition chamber. Vaporized titanium diffuses into the graphite and chemically reacts with the carbon in the graphite to formed titanium carbide. The resulting titanium carbide coated graphite forms an insert structure having a thickness ranging from about 0.0625 inches to about 0.4375 inches. The titanium carbide itself has a thickness ranging from about 0.0045 inches to about 0.075 inches, and preferably, about 0.006 inches.

The titanium carbide coated graphite is a very hard abrasion resistant material but is also brittle. The shell 108 provides structural support for the insert structure 118, thus allowing the titanium carbide layer to prevent abrasive wear to the inner section 114 of the air amplifier 104. In the illustrated embodiment, the titanium carbide has a flexural strength of approximately 13 KSI, an elastic modulus of approximately 1.6 MSI, a coefficient of thermal expansion of approximately 4.7 ppm/F°, a density of approximately 113 lb/ft$^3$ and a microhardness greater than approximately 2500 vickers-100 g load. It should thus be apparent that the material used to form the shell 108 should be structurally stable and preferably have a coefficient of thermal expansion substantially the same as the material used to form the insert structure 118.

The outlet 112 of the air amplifier 104 has a minimum outside diameter MOD and the inlet end 128 of the outlet cone 106 is preferably sized between about 1.00 times the minimum outside diameter MOD of the air amplifier 104 and 1.25 times the minimum outside diameter MOD of the air amplifier 104. An inlet portion 106A of the outlet cone 106 is welded to the mounting ring 125, and thus, secured to the air amplifier 104 with the second portion 118B of the insert structure 118. However, other mounting arrangements are possible, for example, the outlet cone 106 can be mounted such that the inlet 128 of the outlet cone 106 is spaced up to approximately 1.5 inches (3.81 cm) from the outlet 112 of the air amplifier 104. The angle of the sidewalls of the outlet cone 106 can vary between approximately 0° and 10° relative to an axis A of the outlet cone 106.

The axes A of symmetry of the air amplifier 104 and the outlet cone 106 are in substantial alignment with one another. As illustrated in FIG. 2, the axis A of symmetry are in complete alignment. While such alignment is preferred, the air cannon 100 operates properly if the axis A of symmetry of the outlet cone 106 is in alignment within about 0.125 inch (3.2 mm) of the axis A of symmetry of the air amplifier 104. Proper operation of the air cannon 100 has been observed in a working embodiment of the invention if the substantially aligned axes A of symmetry of the air amplifier 104 and the outlet cone 106 are within about 45° of a velocity vector V, see FIG. 1, of chopped fibers as the fibers are discharged from a source of chopped fibers, such as a fiber chopper, and the inlet 110 of the air amplifier 104 is located within approximately 18 inches (45.7 cm) of the discharge from the fiber chopper.

When compressed air is supplied to the air amplifier 104, chopped fibers and ambient air are drawn into the inlet 110 of the air amplifier 104. The air amplifier 104 produces the motive force to convey air and chopped fibers through the air cannon 100. The outlet cone 106 controls the deceleration and diffusion of the air and chopped fiber flowing from the air amplifier 104. The outlet end 129 of the outlet cone 106 is aimed at the moving collection surface 102 to direct chopped fibers onto the surface 102. Turbulent air flow and static forces are overpowered by using the air cannon 100 such that chopped fibers are evenly deposited on the collection surface 102 and static suppression equipment is not needed.

Figure 4:
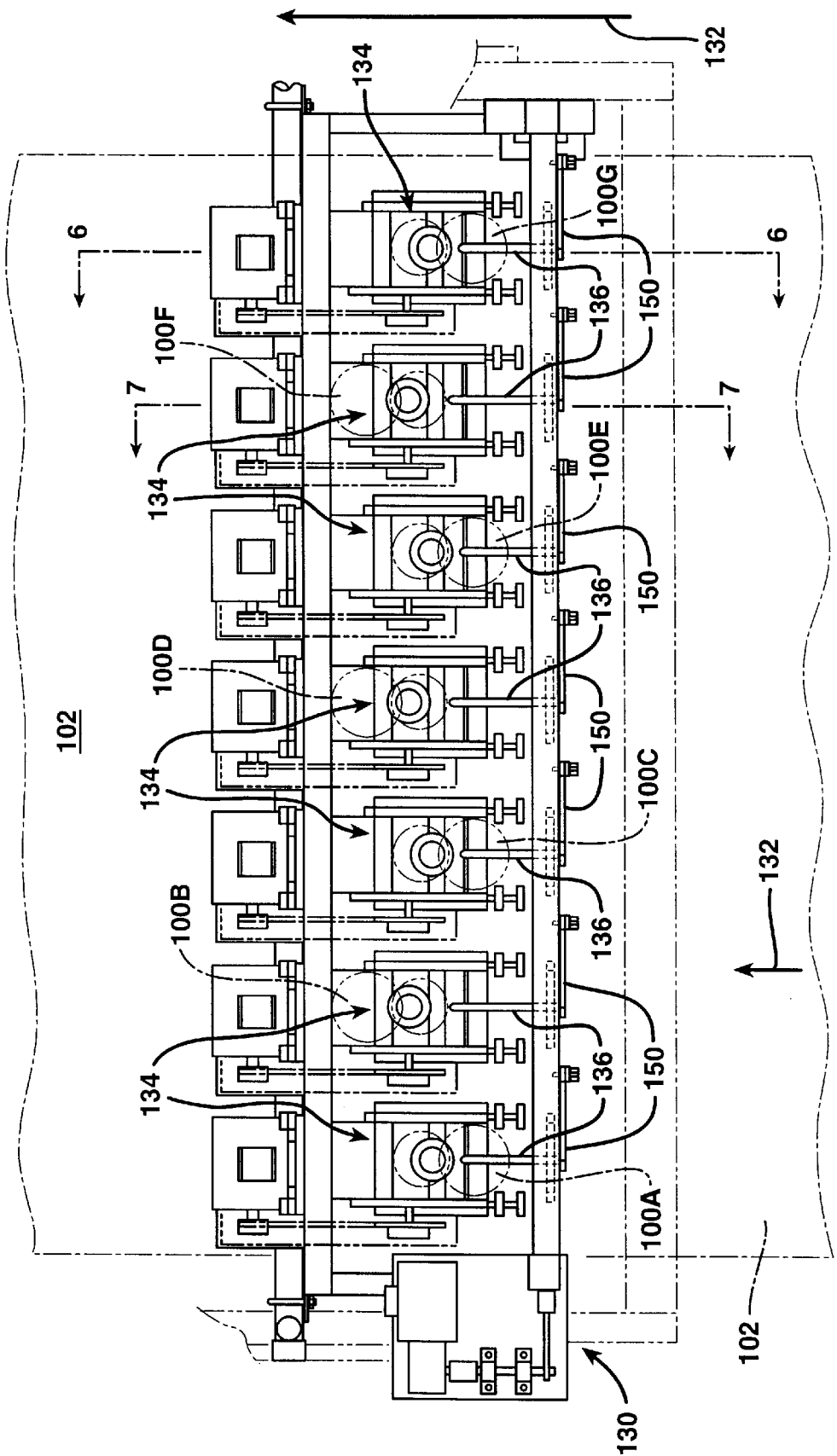

To deposit chopped fibers across a wide moving collection surface, such as the surface 102, at least one bank 130 of air cannons 100 are mounted across the surface 102, see FIGS. 3 and 4. One or more additional banks 130 of air cannons 100 can be provided to increase the thickness of the mat of chopped fibers deposited on the surface 102 with two banks of air cannons 130 being shown in the machine schematically illustrated in FIG. 9. While a bank can comprise a single air cannon with a series of banks stepped or staggered across the surface 102, preferably the bank 130 comprises a plurality of air cannons 100 which are mounted in-line across the surface 102 and positioned relative to one another to reduce interference therebetween. As illustrated in FIGS. 3 and 4, seven air cannons 100 are included in the bank 130, of course more or less than seven air cannons can be used in a bank depending upon the size of the surface 102 and the air cannons.

Figure 9:
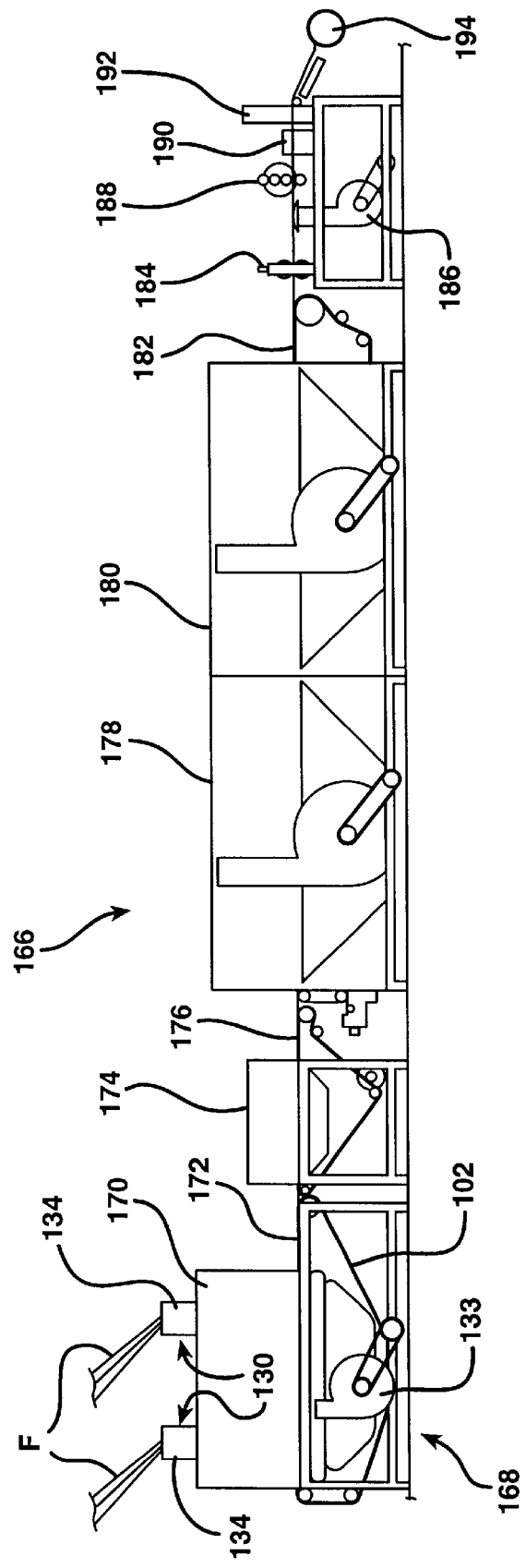
FIG. 9 is a schematic side view of a machine for making chopped strand mat in accordance with the present invention.

The moving collection surface 102 is foraminous and air is drawn through the surface 102 for example by a blower 133, see FIG. 9, to somewhat assist in deposition of chopped fibers on the surface 102 and more importantly to carry away air received from the air cannons 100. The surface 102 moves from up-line of the bank 130 to down-line of the bank 130 as indicated by an arrow 132, see FIGS. 4 and 5. For the bank 130 of seven air cannons 100 illustrated in FIGS. 3 and 4, four of the air cannons 100A, 100C, 100E, 100G are aimed up-line and three of the air cannons 100B, 100D, 100F are aimed down-line to reduce interference between the flows of air and chopped fibers from the air cannons 100. Fibers F are fed into fiber choppers 134 as shown in FIGS. 5 and 9 in a conventional manner with one fiber chopper 134 being provided for each air cannon 100, see FIGS. 3 and 4.

Figure 6:
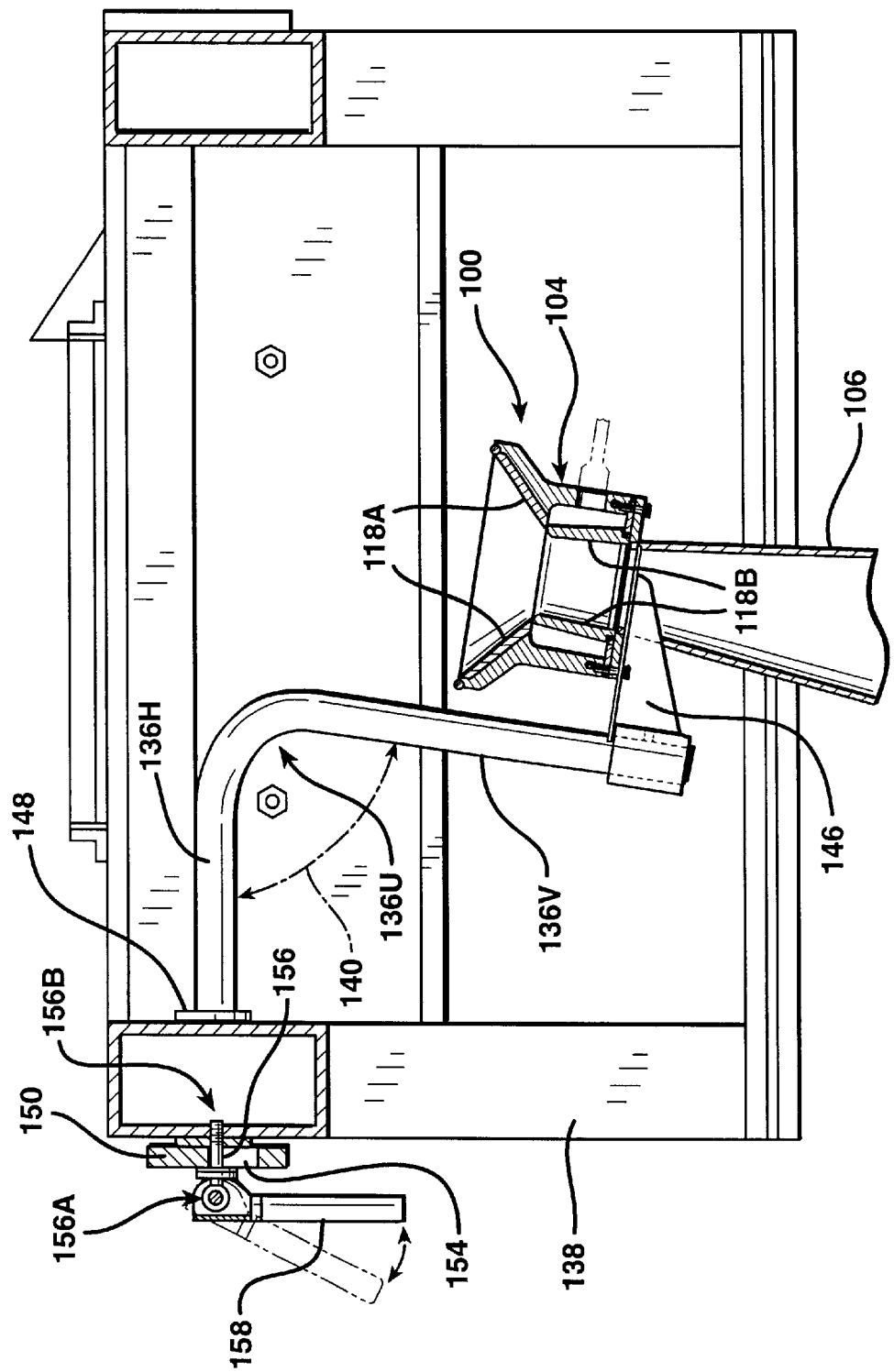
FIG. 6 is a cross-sectional view through an up-line directed air cannon of the bank of air cannons shown in FIGS. 3–5 taken along the section line 6—6 in FIG. 4.
Figure 7:
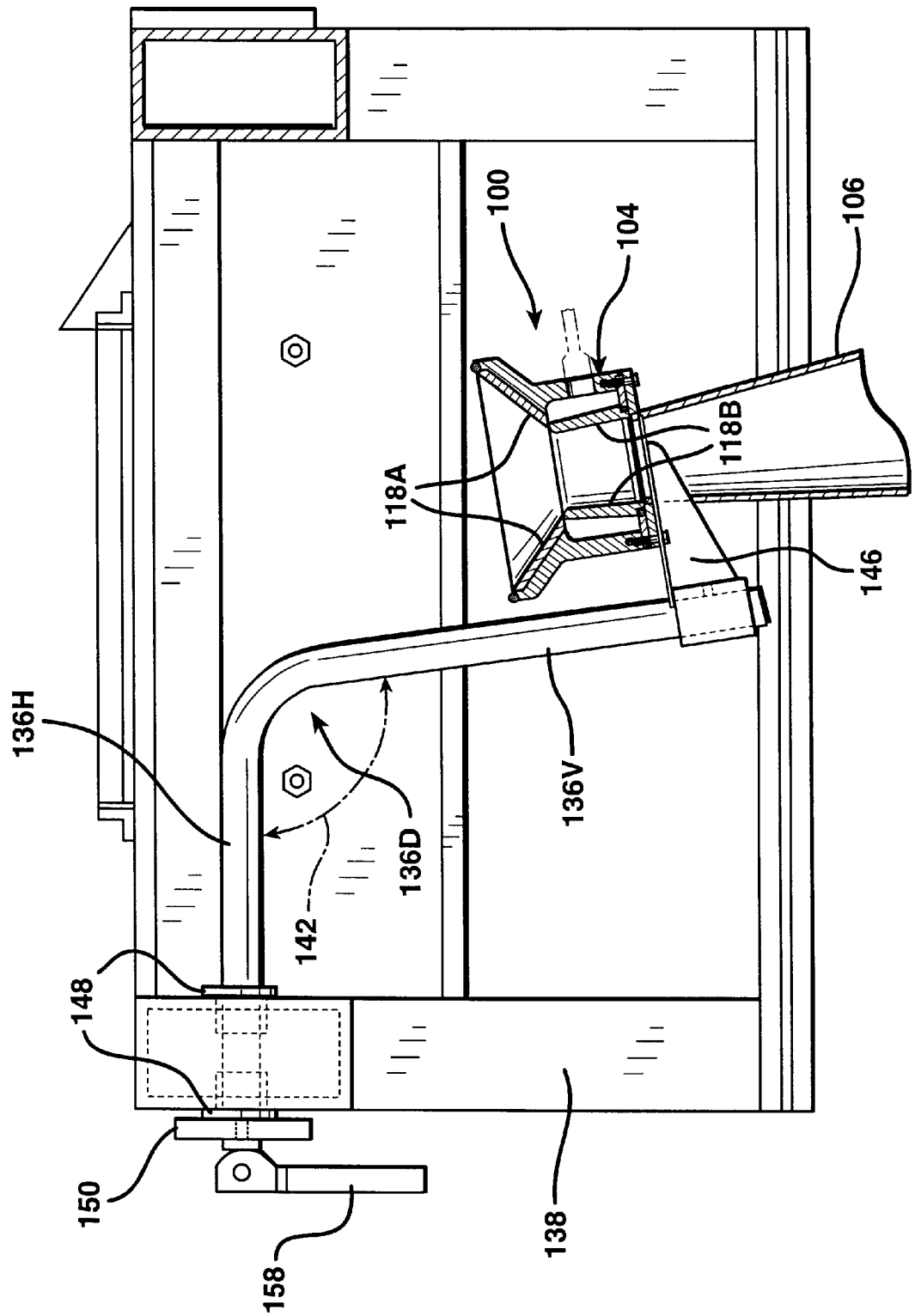
FIG. 7 is a cross-sectional view through a down-line directed air cannon of the bank of air cannons shown in FIGS. 3–5 taken along the section line 7—7 in FIG. 4.

Referring now to FIGS. 5–7, the up-line and down-line aiming of the air cannons 100 is accomplished by mounting the air cannons 100 on generally L-shaped rods 136 made of steel and having generally horizontal legs 136H pivotally mounted to a support frame 138 and generally vertical legs 136V with the air cannons 100 secured to the generally vertical legs 136V. The L-shaped rods 136 have alternating acute and obtuse angles between their horizontal and vertical legs to direct alternate ones of the air cannons 100 up-line and down-line. As shown in FIG. 6, an L-shaped rod 136U includes an acute angle 140 between its horizontal and vertical legs 136H, 136V such that the air cannon 100 mounted thereto is directed up-line, see FIGS. 3–5. FIG. 7 illustrates an L-shaped rod 136D which includes an obtuse angle 142 between its horizontal and vertical legs 136H, 136V such that the air cannon 100 mounted thereto is directed down-line, see FIGS. 3–5. The air amplifier 104 and outlet cone 106, which is secured to the air amplifier 104, are supported from the generally vertical legs 136V of the L-shaped rods 136 by brackets 146. Each of the brackets 146 is secured to each respective air amplifier 104 by one or more of the bolts 127.

Figure 8:
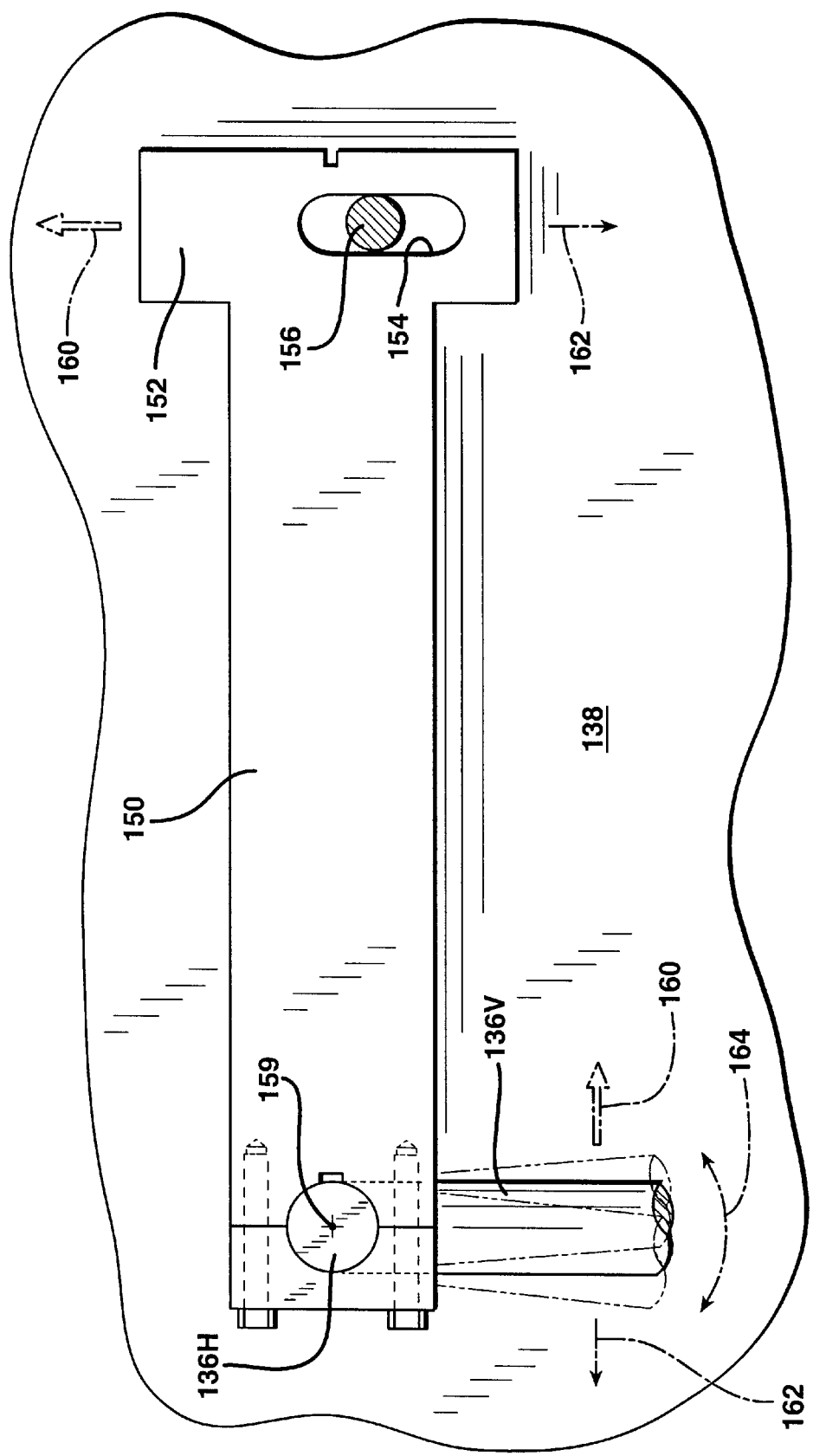
FIG. 8 illustrates an adjustment arm for adjusting the cross-mat positioning of the air cannons shown in FIGS. 3–5.

In addition to the up-line and down-line alternation of the air cannons 100, each of the air cannons 100 can be moved in the cross direction or from side-to-side as shown in FIGS. 3 and 4. This side-to-side or cross-mat movement of the air cannons 100 is performed by rotating the generally horizontal legs 136H in bearings 148 which provide the pivotal mounting of the generally L-shaped rods 136 to the support frame 138. To this end, a first end of an adjustment arm 150 is secured and preferably keyed to the ends of each of the generally horizontal legs 136H, see FIG. 8. A second end of each adjustment arm 150 terminates in an adjustment plate 152 which includes an oblong slot 154 formed therein.

An eye bolt 156 having an eye 156A on one end and threads 156B on the other end is passed through the slot 154 and threaded into a threaded bore appropriately located on the support frame 138, see FIG. 6. A cam lever 158, see FIGS. 3, 5, 6 and 7, is mounted for pivotal movement to the eye 156A of the eye bolt 156. When the cam lever 158 is raised, the adjustment arm 150 can be moved upward or downward about an axis 159 with its movement being limited by the ends of the slot 154 engaging the eye bolt 156. For upward movement of the adjustment arm 150, the generally vertical leg 136V moves to the right as indicated by arrows 160, and for downward movement of the adjustment arm 150, the generally vertical leg 136V moves to the left as indicated by arrows 162, see FIG. 8. Once the adjustment arm 150 is positioned such that the air cannon 100 is aimed as desired, the cam lever 158 is lowered to lock the adjustment arm 150 to the support frame 138. As should be apparent, the generally vertical legs 136V and hence the air cannons 100 can thus be adjusted back and forth relative to the surface 102 in a generally arcuate motion as indicated by double-headed arrow 164, see FIG. 8.

Reference will now be made to FIG. 9 which schematically illustrates a machine 166 for making chopped strand mat in accordance with the present invention. A station 168 includes two banks 130 of air cannons 100 represented by the fiber choppers 134 which receive and chop fibers F and pass chopped fibers to the air cannons 100 as described above. The air cannons 100 are not shown but are positioned within the forming hood 170 of the station 168.

A mat 172 of chopped fibers as deposited on the moving collection surface 102 is passed to a binder depositor 174 wherein a binder is applied to the mat 172 of chopped fibers. For example, for a powder mat, the binder may be powdered unsaturated polyester having a glass transition point from approximately 95° F. to 160° F., preferably between about 105° F. to 120° F., which is applied to the mat 172; and, for an emulsion mat, the binder may be a liquid polyvinyl acetate emulsion which is sprayed onto the mat 172.

The resulting binder treated mat 176 is passed through apparatus for applying energy, for example heat applied by ovens 178, 180 as illustrated in FIG. 9, to activate the binder, i.e., to liquify a powder thermoplastic binder, to drive off the water from an aqueous binder or to effect curing of a thermosetting binder. It is noted that for production of a mat using an aqueous binder, the application of energy, such as heat, may not be required since the mat may be air dried; however, for faster drying it is preferred. The resulting chopped strand mat 182 is then passed through compacting/cooling rollers 184, after which it is further cooled by a cooling fan 186.

The chopped strand mat may then be passed through slitters 188 which cut the chopped strand mat to desired widths, feed rollers 190 and a cutter 192 which cuts the continuous mat into appropriate package lengths. Finally, the chopped strand mat is rolled up to form a roll package 194. Those desiring additional details regarding the production of chopped strand mat and the like, which are well known by those skilled in the art, can be determined by reference to *The Manufacturing Technology of Continuous Glass Fibres*, Second edition, by K. L. Loewenstein, published by Elsevier in 1983 which is incorporated herein by reference. It is noted that any type of appropriate process may be employed down-line of the station 168 to form chopped strand mat from the mat 172 which is produced by the station 168.

Having thus described the invention of the present application in detail and by reference to preferred embodiments thereof, it will be apparent that modifications and variations are possible without departing from the scope of the invention defined in the appended claims.

What is claimed is:

1. An air cannon for collecting chopped fibrous material and depositing received chopped fibers on a moving collection surface, said air cannon comprising:

an air amplifier having an inlet receiving said chopped fibers, an outlet, and an inner section defining a passage through said air amplifier extending from said inlet to said outlet, said air amplifier being driven by compressed air which enters said passage of said air amplifier through an air passageway, at least a portion of said inner section of said air amplifier being formed of an abrasion resistant material; and an outlet cone having an inlet end positioned adjacent said outlet of said air amplifier and an outlet end for directing chopped fibers onto said moving collection surface.

2. An air cannon as claimed in claim 1 wherein substantially all of said inner section of said air amplifier is formed of said abrasion resistant material.

3. An air cannon as claimed in claim 1 wherein said abrasion resistant material comprises a metal carbide.

4. An air cannon as claimed in claim 3 wherein said abrasion resistant material comprises metal carbide coated graphite.

5. An air cannon as claimed in claim 3 wherein said metal carbide is selected from titanium carbide, tungsten carbide, or chromium carbide.

6. An air cannon as claimed in claim 1 wherein said abrasion resistant material has a thickness ranging from approximately 0.0045 inches to approximately 0.0075 inches.

7. An air cannon as claimed in claim 6 wherein said abrasion resistant material has a thickness of approximately 0.006 inches.

8. An air cannon as claimed in claim 1 wherein the microhardness of said abrasion resistant material is greater than approximately 2500 vickers-100 g load.

9. An air cannon as claimed in claim 1 wherein said air amplifier comprises a shell having an inner surface defining said inner section of said air amplifier.

10. An air cannon as claimed in claim 1 wherein said air amplifier comprises a shell and insert structure having an inner surface which defines said inner section of said air amplifier, said insert structure being received in said shell.

11. An air cannon as claimed in claim 10 wherein a portion of said insert structure is adhesively bonded to said shell.

12. An air cannon as claimed in claim 10 wherein said shell is formed of a material selected from aluminum, steel, stainless steel, plastic or glass.

13. An air cannon as claimed in claim 10 wherein said insert structure comprises a truncated cone shaped first portion and a truncated cone shaped second portion.

14. An air cannon as claimed in claim 13 wherein said first portion and said second portion are separate and distinct components.

15. An air cannon for collecting chopped fibrous material and depositing received chopped fibers on a moving collection surface, said air cannon comprising:

an air amplifier having an inlet receiving said chopped fibers, an outlet, and an inner section defining a passage through said air amplifier extending from said inlet to said outlet, said air amplifier comprising a shell and insert structure coupled to said shell, said insert structure having an inner surface which defines said inner section of said air amplifier, said insert structure being formed of titanium carbide and comprising a truncated cone shaped first portion and a truncated cone shaped second portion, said air amplifier being driven by compressed air which enters said passage of said air amplifier through an air passageway between said first portion and said second portion; and an outlet cone having an inlet end positioned adjacent said outlet of said air amplifier and an outlet end for directing chopped fibers onto said moving collection surface.

16. Apparatus for collecting chopped fibrous material and depositing received chopped fibers on a moving collection surface, said apparatus comprising at least one air cannon, said at least one air cannon comprising:

an air amplifier having an inlet receiving said chopped fibers, an outlet, and an inner section defining a passage through said air amplifier extending from said inlet to said outlet, said air amplifier being driven by compressed air which enters said passage of said air amplifier through an air passageway, at least a portion of said inner section being formed of an abrasion resistant material; and an outlet cone having an inlet end positioned adjacent said outlet of said air amplifier and an outlet end for directing chopped fibers onto said moving collection surface.

17. Apparatus as claimed in claim 16 wherein substantially all of said inner section is formed of said abrasion resistant material.

18. Apparatus as claimed in claim 17 wherein said abrasion resistant material comprises a metal carbide.

19. Apparatus as claimed in claim 18 wherein said apparatus comprises at least one bank of air cannons mounted across said moving collection surface, said bank comprising a plurality of air cannons which are positioned relative to one another to reduce interference therebetween.

20. Apparatus as claimed in claim 19 further comprising a plurality of generally L-shaped rods for mounting said plurality of air cannons to direct alternate air cannons up-line and down-line relative to movement of said moving collection surface to thereby reduce interference between said plurality of air cannons, said L-shaped rods having generally horizontal legs mounted to a support frame and generally vertical legs with said air cannons secured thereto, the L-shaped rods having alternating acute and obtuse angles between their generally horizontal and generally vertical legs to direct alternate air cannons up-line and down-line.

21. Apparatus as claimed in claim 20 wherein said generally horizontal legs of said mounting rods are mounted for rotation in said support frame for movement of said air cannons in the cross direction of said moving collection surface and further comprise adjustment arms secured to said generally horizontal legs for adjusting the rotational position of said generally horizontal legs of said L-shaped rods.

22. Apparatus as claimed in claim 21 further comprising locking devices associated with said adjustment arms for locking said adjustment arms and hence said generally horizontal legs in preferred rotational positions.

23. Apparatus as claimed in claim 22 wherein said locking devices comprise eye bolts passing through oblong holes in said adjustment arms and cam levers pivotally mounted to said eye bolts, said cam levers in one position releasing said adjustment arms for movement of said adjustment arms within limits defined by said oblong holes and said eye bolts, and in another position securing said adjustment arms to said support frame for maintaining adjustments of said mounting rods and thereby cross direction positioning of said air cannons.

24. Apparatus as claimed in claim 23 wherein said outlet cone is secured to said air amplifier.

25. Apparatus as claimed in claim 24 wherein said apparatus comprises two banks of air cannons mounted across said moving collection surface.

* * * * *